United States Patent
Hocker et al.

(10) Patent No.: US 10,855,888 B2
(45) Date of Patent: Dec. 1, 2020

(54) SOUND SYNCING SIGN-LANGUAGE INTERPRETATION SYSTEM

(71) Applicant: SignGlasses, LLC, Provo, UT (US)

(72) Inventors: Korey Hocker, Orem, UT (US); Kyle Joseph Taylor, Lehi, UT (US)

(73) Assignee: SIGNGLASSES, LLC, Provo, UT (US)

( * ) Notice: Subject to any disclaimer, the term of this patent is extended or adjusted under 35 U.S.C. 154(b) by 0 days.

(21) Appl. No.: 16/723,707

(22) Filed: Dec. 20, 2019

(65) Prior Publication Data

US 2020/0213479 A1  Jul. 2, 2020

Related U.S. Application Data

(60) Provisional application No. 62/786,201, filed on Dec. 28, 2018.

(51) Int. Cl.
*H04N 5/04* (2006.01)
*H04N 5/445* (2011.01)
*H04N 5/272* (2006.01)
*G09B 21/00* (2006.01)

(52) U.S. Cl.
CPC ............. *H04N 5/04* (2013.01); *G09B 21/009* (2013.01); *H04N 5/272* (2013.01); *H04N 5/44513* (2013.01); *H04N 5/44591* (2013.01); *H04N 2005/44526* (2013.01)

(58) Field of Classification Search
CPC ...... H04N 5/04; H04N 5/272; H04N 5/44513; H04N 5/44591; H04N 2005/44526; G09B 21/009
See application file for complete search history.

(56) References Cited

U.S. PATENT DOCUMENTS 9,609,397 B1 * 3/2017 Barreira Avegliano .................... H04N 21/8547
2013/0204605 A1 * 8/2013 Illgner-Fehns .......... G06F 40/40 704/2

* cited by examiner

*Primary Examiner* — Michael E Teitelbaum
(74) *Attorney, Agent, or Firm* — Workmann Nydegger; Michael J. Frodsham; William Brad Barger (57) ABSTRACT

A computer system for providing on-demand sign-language translation services receives a first audio recording of ambient noise. The computer system then accesses a database of audio fingerprints. Using the audio fingerprints, the computer system identifies within the first audio recording a particular audio fingerprint from the database of audio fingerprints. The computer system then identifies within the particular audio fingerprint a particular timestamp associated with the first audio recording. The computer system accesses a database of translated audio. The computer system accesses a portion of the translated audio that corresponds with the particular time stamp. The computer system then displays on a user interface the portion of the translated audio.

18 Claims, 4 Drawing Sheets

SOUND SYNCING SIGN-LANGUAGE INTERPRETATION SYSTEM

CROSS-REFERENCE TO RELATED APPLICATIONS

This application claims the benefit of and priority to U.S. Provisional Patent Application Ser. No. 62/786,201 filed on 28 Dec. 2018 and entitled "SOUND SYNCING SIGN-LANGUAGE INTERPRETATION SYSTEM," which application is expressly incorporated herein by reference in its entirety.

BACKGROUND

Hearing loss affects many people around the world. To assist individuals with impaired hearing, various devices, such as hearing aids, have become available. While hearing aids provide an important service to some individuals with impaired hearing, hearing aids often are unable to assist individuals with disabling levels of hearing loss.

Historically, many individuals with disabling hearing loss have relied upon sign language to communicate. Persons with impaired hearing are often provided with translation services in a variety of circumstances. For example, educational institutions such as colleges and universities are required under Title III of the Americans with Disabilities Act (ADA) to provide deaf and hard of hearing students with qualified interpreters, captioning, assistive listening devices, and/or other auxiliary aids and services. AMERICANS WITH DISABILITIES ACT OF 1990, PL 101-336, Jul. 26, 1990. These requirements apply to postsecondary educational institutions whether or not they receive any form of federal financial assistance.

Beyond the educational sphere, hosts of presentation or lecture events often desire to provide cost-efficient interpretation services for attendees with impaired hearing. For lengthy events, multiple translators are often necessary. Additionally, individuals with impaired hearing may desire on-demand translation services for events that would require multiple and/or specialized interpreters. Similar challenges are experienced by museums, cultural attractions, amusement parks, airports, and nearly any other public facing accommodation that desires to communicate publicly to its patrons.

Therefore, there exists a need for improved systems and methods for facilitating on-demand interpretation services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein comprise methods, systems, and apparatus for providing on-demand language translation services. For example, disclosed embodiments comprise systems that receive from a microphone a first audio recording of ambient noise. The system then accesses a database of audio fingerprints. Each fingerprint within the audio fingerprints comprises information for identifying time stamps within audio files associated with each audio fingerprint. The system identifies within the first audio recording a particular audio fingerprint from the database of audio fingerprints. Additionally, the system identifies within the particular audio fingerprint a particular timestamp associated with the first audio recording. The system then accesses a database of translated audio. Further, the system accesses a portion of the translated audio that corresponds with the particular time stamp. Further still, the system displays on a user interface the portion of the translated audio.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings, as summarized below.

DETAILED DESCRIPTION

Embodiments disclosed herein comprise methods, systems, and apparatus for providing on-demand language translation services. For example, disclosed embodiments comprise a display device and a recording device working together in tandem. The recording device capture audio noise from the user's environment. The noise is mapped to audio fingerprints within a database of pre-recorded, pre-fingerprinted audio files. Once an appropriate audio file is identified by fingerprint, a timestamp associated within the currently recorded audio is identified. The timestamp is used to identify a correct location within a translation file. The translation file is then displayed to the user such that the user is able to view captions or sign-language translation of the recorded audio.

Figure 1:
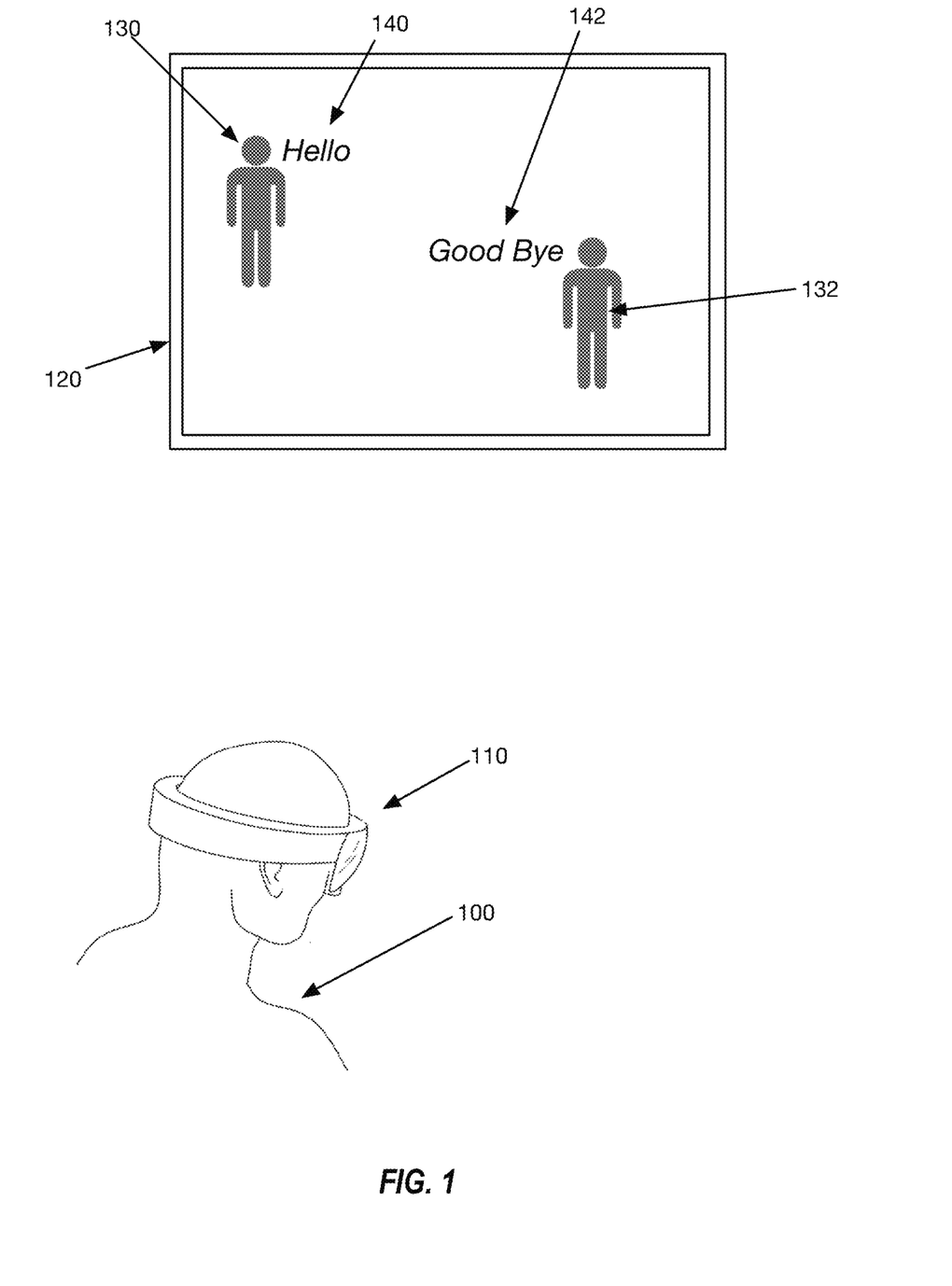
FIG. 1 illustrates an embodiment of a system for providing on-demand language translation services with respect to a movie.

Turning now to the figures, FIG. 1 illustrates an embodiment of a system for providing on-demand language translation services with respect to a movie. The depicted embodiment comprises a user 100 wearing a head-mounted display 110. The user is viewing a movie screen 120 that is displaying a first individual 130 conversing with a second individual 132.

One will appreciate that the depicted figure is provided only for the sake of example and explanation. In various additional or alternative embodiments, the user 100 may be wearing a different configuration of a head-mounted display 110. Additionally, in at least one embodiment, the user 100 may utilize a mobile computing device, such as a smart phone, tablet, laptop, or wearable, in place of the head-mounted display 110. Accordingly, one will appreciate that any reference to a specific hardware configuration within this specification is merely exemplary unless otherwise stated is not limiting the invention to a particular device or system.

Additionally, in at least one embodiment, the user 100 may be viewing a scene other than a movie screen 120. For example, the user may be viewing a television screen, a computer screen, or any other recorded visual media.

In at least one embodiment, the head-mounted display 110 comprises a microphone that receives an audio recording of ambient noise. As in FIG. 1, when the user is within a movie theater, the ambient noise comprises the audio track of the movie. One will appreciate that in some circumstances the ambient noise also comprises environmental noise such as other people in the audience conversing, the sound of air conditioning, the sounds of people moving in their seats, etc. As such, the system is capable of filtering out environment noise and/or identifying the target audio (i.e., the audio track of the movie) despite the environmental noise. In the depicted example, the audio track comprises the first individual 130 saying "Hello" to the second individual and the second individual 132 saying "Good Bye" to the first individual 130.

Once the head-mounted display 110 has captured the audio recording, the system accesses a database of audio fingerprints. The database of audio fingerprints may comprise spectrograms, Fourier transforms, or any other known means for fingerprinting an audio signal. Additionally, each fingerprint within the audio fingerprints comprises information for identifying time stamps within audio files associated with each audio fingerprint.

Additionally or alternatively, the system may comprise an interface that allows a user to enter information relating to the movie. For example, a user may select the movie title or enter the movie name into the interface. The system may then search for the audio track based upon the user input. Once the audio track is found, the system may utilize an audio fingerprint of the currently received ambient noise to identify a time stamp within the audio track that matches the ambient noise that the head-mounted display 110 is currently receiving.

As such, the audio fingerprint identities the audio that is being recorded and identifies a time stamp, or position in time, where the audio is relative to the total recorded length of the audio file. For example, the user 100 may be watching a 90-minute movie. The audio fingerprint that is derived from the recorded audio can determine that the first individual 130 says "Hello" and the second individual 132 says "Good Bye" at exactly 37 minutes 15 seconds into the movie. In at least one embodiment, the database of audio fingerprints comprises a network connected database of movies, TV shows, museum guided-tours, songs, and any other audio file that has been uploaded and analyzed into the database.

Once the timestamp of the recorded audio has been identified, the system accesses a database of translated audio. The database of translated audio may comprise closed captioning data for the audio file, a transcription for the audio file, a video of time-synced sign-language translation, and/or various other related information. The system can access a portion of the translated audio that corresponds with the particular time stamp that was received from the database of audio fingerprints.

Once the system has gathered the correct portion of the translated audio, the system displays on a user interface the portion of the translated audio. For example, in FIG. 1, the head-mounted display 110 overlays the translated audio 140, 142 over the movie screen 120. The head-mounted display 110 may display the translated audio 140, 142 at a static location at the bottom of the screen, at a static location on the head-mounted display, or at dynamic locations based upon data associated within the translated audio.

For instance, in at least one embodiment, the database of translated audio provides relative translation location information for different segments of translated audio. As depicted in FIG. 1, the first individual 130 says "Hello," and the second individual says "Good Bye." Using the relative translation location information for the different segments of translated audio, the head-mounted display 110 overlays the first translated audio segment 140 adjacent to the first individual 130. Similarly, the head-mounted display 110 overlays the second translated audio segment 142 adjacent to the second individual 132.

In at least one embodiment, the relative translation location of the translated audio 140, 142 is identified by a video camera integrated within the head-mounted display 110. For instance, the video camera may capture a target object, in this case an image of the movie screen 120. The head-mounted display 110 may then use image recognition or line recognition to identify the outer boundaries of the movie screen. The relative translation location of the translated audio 140, 142 may then be provided as grid coordinates, which the head-mounted display overlays on the movie screen. In an alternative embodiment, the head-mounted display 110 uses image processing to identify visual landmarks displayed on the movie screen 120. The head-mounted display 110 then calculates the relative translation location of the translated audio 140, 142 based upon the identified visual landmarks. In some cases, standard closed-captioning formats may comprise some relative translation location information that can be leveraged by the system to display the translated audio 140, 142, at a desired translation location.

In at least one embodiment, the head-mounted display 110 overlays the text such that the text remains at the same physical location without regard to the user's 100 head position. For example, the head-mounted display 110 may display the translated text 140, 142 at the relative translation locations on the movie screen 120 as indicated. If the user 100 then turns his head such that he is looking away from the movie screen, the user 100 will not be able to see the translated audio 140, 142. However, once the user 100 looks back at the movie screen 120, the translated text 140, 142 is viewable in its relative translation location.

In contrast, in at least one embodiment, the head-mounted display 110 displays the translated audio 140, 142 at the same physical location on the head-mounted display. As such, if the user 100 looks away from the screen, the translated audio 140, 142 is still visible to the user on the head-mounted display 110. Similarly, in at least one embodiment, a user 100 can manually lock the translated audio 140, 142 to appear in the same physical location. For example, the user 100 way indicate that he wants to translated audio 140, 142 to appear at the bottom of the movie screen 120. Upon locking the translated audio 140, 142 to that relative translation location, the user 100 can look away from the movie screen 120 and the audio translation 140, 142 will stay locked to the physical location below the movie screen 120.

In at least one embodiment, throughout the translation process, the microphone integrated into the head-mounted display 110 continues to receive a second audio recording of the ambient noise. The head-mounted display 110 continues to identify within the particular audio fingerprint a second timestamp associated with the second audio recording. The head-mounted display 110 resynchronizes the portion of the translated audio with the second timestamp. As such, the head-mounted display 110 is continually resynchronizing the translated audio to the recorded audio. Such resynchronization may assist in the accuracy of the translation and/or the ability to identify when a new audio track is being played.

Figure 2:
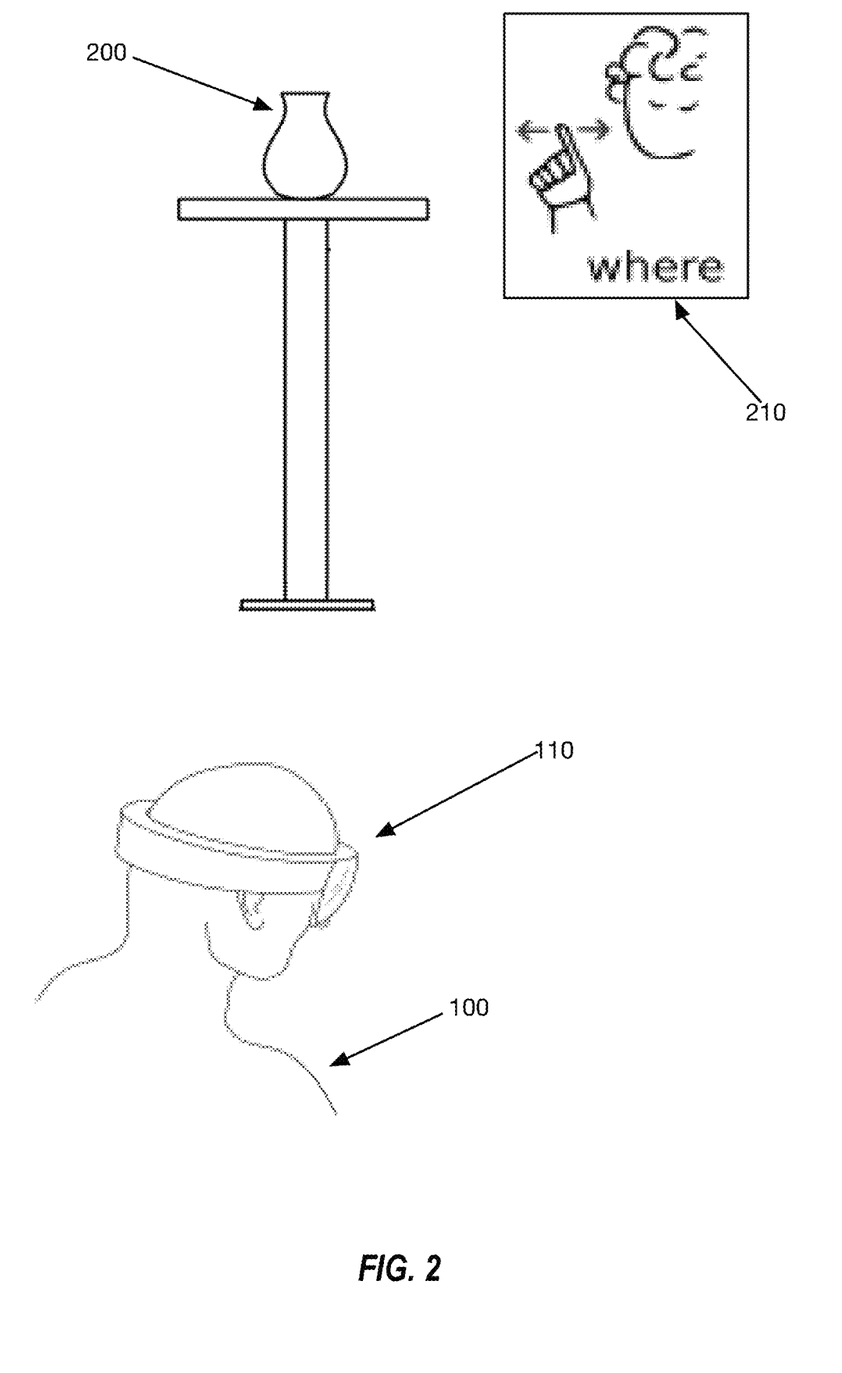
FIG. 2 illustrates an embodiment of a system for providing on-demand language translation services with respect to a physical object.

Turning now to FIG. 2, FIG. 2 illustrates an embodiment of a system for providing on-demand language translation services with respect to a physical object. In FIG. 2, the user 100 is viewing a museum piece 200 through a head-mounted display 110. One will appreciate that some museums provide an audio guided tour or provide an audio experience in relation to the displays. The audio guide tour may comprise a pre-recorded audio track that guides the user through the museum and teaches the user about various exhibits. Additionally or alternatively, each exhibit may comprise its own speaker system that plays an audio track on loop or on demand to teach viewers about the exhibit.

In at least one embodiment, the head-mounted display 110 uses image recognition and/or SLAM coordinates to identify the location and presence of the museum piece 200. The head-mounted display 110 then provides a translation of the recorded audio that is being played with respect to the museum piece 200. In the depicted example, the translation comprises a video of a sign-language translation 210. In the depicted video a person is signing the translation of the recorded audio to the user 100. Further, in at least one embodiment, the video of a sign-language translation 210 may also comprise captions.

The head-mounted display 110 is also able to display the video of a sign-language translation 210 at a relative translation location with respect to the museum piece 200. For example, the head-mounted display 110 may receive the video of a sign-language translation 210 and the video may be associated with particular relative translation location data. Using the data and the image recognition, the head-mounted display 110 overlays the video of a sign-language translation 210 at the relative translation location.

In at least one embodiment, the head-mounted display 110 stops translating when the audio recording no longer matches to an audio fingerprint. As such, if the user 100 moves on to another museum piece 200, the head-mounted display 110 will stop translating. Additionally, in at least one embodiment, the head-mounted display 110 is configured to use eye-tracking technology in order to track the user's gaze. Using the tracked gaze, the head-mounted display 110 determines which museum piece 200 the user is looking at. The head-mounted display 110 then displays the correct sign-language translation 210, or other translation, to the user based upon the object that the use is gazing at. Such a system may also dynamically switch translations videos as the user gazes at different museum pieces 200.

Additionally, the eye-tracking may also assist the system in filtering out ambient noise. For example, the eye tracking technology may identity the museum piece that the user 100 is viewing. Based upon the identified piece, the system may look up the audio file associated with the museum piece and then identify an appropriate time stamp within the audio file to synchronize the translation with.

In view of the disclosed embodiments, one will appreciate the benefit provided by the systems and methods for providing on-demand sign-language translation services. For example, a user 100 can bring a head-mounted display 110 to any location with pre-recorded audio. If the audio has been fingerprinted and translated, the user 100 is provided with on-demand translation services that do not require an in-person translator and do not require any external systems.

Additionally, one will appreciate that the head-mounted display 110 is provided for the sake of example. In alternative embodiments, other mobile devices, such as a smart phone, can be used to provide similar translation services.

Figure 3:
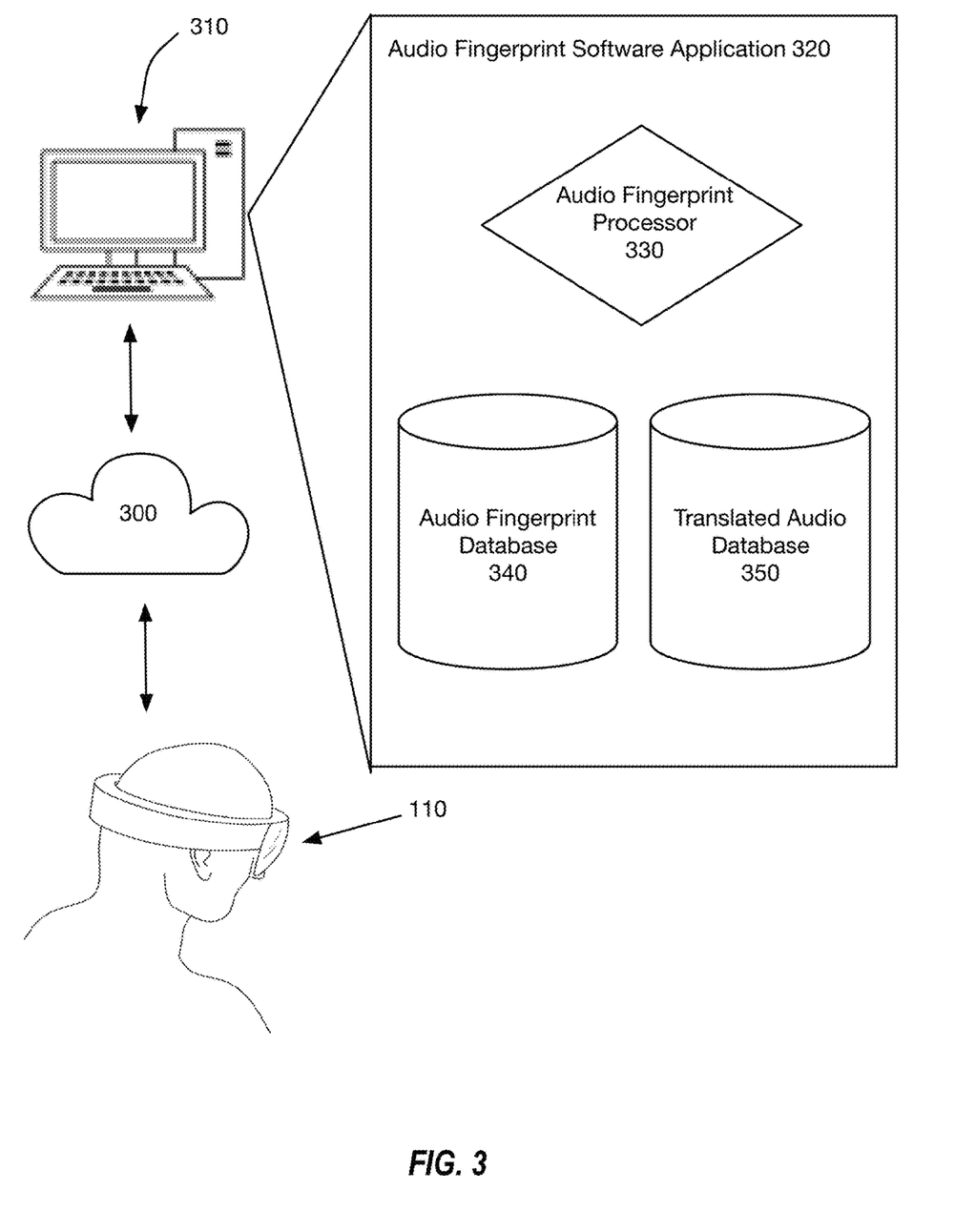
FIG. 3 illustrates an embodiment of a computer system for providing on-demand language translation services.

FIG. 3 illustrates an embodiment of a computer system for providing on-demand language translation services. In the depicted embodiment, the head-mounted display 110 is in communication with a computer system 310 through a network connection 300. One will appreciate, however, that the depicted embodiment is merely exemplary. In additional or alternative embodiments, the computer system 310 may be wholly integrated or partially integrated within the head-mounted display 110. As such, in at least one embodiment, it is not necessary for the head-mounted display 110 to communicate through a network connection 300; instead, all of the necessary databases and processing capabilities are present within the head-mounted display 110 itself.

Turning back to the embodiment depicted in FIG. 3, the head-mounted display 110 is configured to communicate to the computer system 310 through a network connection, such as a WIFI connection. The computer system 310 may be located within the same building as the head-mounted display 110 or may be a remote server that is connected to the Internet. The head-mounted display 110 may be configured to gather ambient noise through a microphone and/or visual images from a camera and transmit the recorded data to the computer system 310.

The computer system 310 comprises an audio fingerprint software application 320 that is configured to process the received audio data. For example, the audio fingerprint software application 320 may comprise an audio fingerprint processor 330 that matches the received ambient noise recording to an audio fingerprint stored within the database 340. The audio fingerprint processor 330 may comprise a software algorithm, a hardware processor, and/or a combination thereof.

The audio fingerprint processor 330 identifies within the audio recording a particular audio fingerprint by converting the recorded audio into spectrograms, Fourier transforms, or any other known means for fingerprinting an audio signal. As mentioned above, one will appreciate that this step and other steps may be performed locally at a portion of the computer system 310 located in the head-mounted display 110 or at a remote computer system 310. The audio fingerprint processor 330 may then access the database of audio fingerprints 340. Each fingerprint within the audio fingerprints comprises information for identifying time stamps within audio files associated with each audio fingerprint.

The audio fingerprint processor 330 identifies within the particular audio fingerprint a particular timestamp associated with the first audio recording. The audio fingerprint processor 330 then accesses a database of translated audio 350 and accesses a portion of the translated audio that corresponds with the particular time stamp. The computer system 310 sends the portion of the translated audio to the head-mounted display 110 for display on a user interface as depicted in FIG. 1 and FIG. 2.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
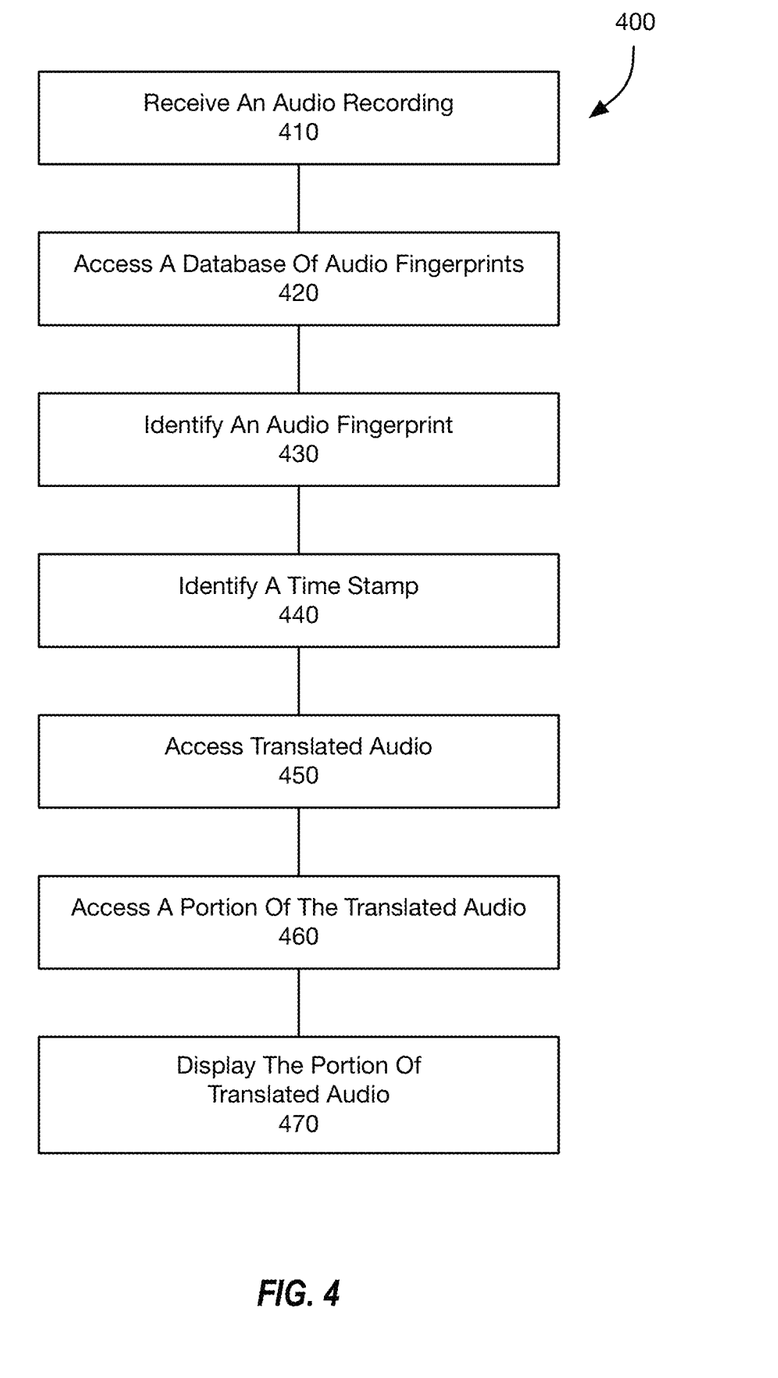
FIG. 4 illustrates various steps in a flowchart for a method of providing on-demand language translation services.

FIG. 4 illustrates various steps in a flowchart for a method 400 of providing on-demand language translation services. The method 400 includes an act 410 of receiving an audio recording. Act 410 can comprise receiving from a microphone a first audio recording of ambient noise For example, the head-mounted display 110 of FIG. 1 may comprise a microphone that receives a recording of audio from the movie that is being displayed on the movie screen 120.

Method 400 also includes an act 420 of accessing a database of audio fingerprints. Act 420 can comprise accessing a database of audio fingerprints 340, wherein each fingerprint within the audio fingerprints comprises information for identifying time stamps within audio files associated with each audio fingerprint. For example, the head-mounted display 110 can connect to a database of audio fingerprints 340 through a network connection 300 or may connect to a locally stored database of audio fingerprints. As used herein, the database of audio fingerprints 340 comprises any form of stored audio fingerprints.

Additionally, Method 400 includes an act 430 of identifying an audio fingerprint. Act 430 can comprise identifying within the first audio recording a particular audio fingerprint from the database of audio fingerprints 340. For example, the head-mounted display 110 can upload the audio recording directly to a network-connected audio fingerprint database 340 for analysis. In contrast, in at least one embodiment, the head-mounted display 110 can performed some initial processing prior to uploading the audio recording. For instance, the head-mounted display 110 may perform a fast-Fourier transform on the audio recording prior to uploading it to the audio fingerprint database 340.

Method 400 also includes an act 440 of identifying a time stamp. Act 440 can comprise identifying within the particular audio fingerprint a particular timestamp associated with the first audio recording. For example, the head-mounted display 110 or a remote system in communication with the head-mounted display 110 can match the audio fingerprint to a particular time stamp associated with an audio file within the database of audio fingerprints 340.

Method 400 further includes an act 450 of accessing translated audio. Act 450 can comprise accessing a database of translated audio 350. For example, once an audio fingerprint is matched to audio file, the head-mounted display 110 or some other remote system can access a database of translated audio 350. The database of translated audio 350 comprises translations of various audio files, wherein the translations comprise closed captions and/or videos of sign-language translations of the respective audio file.

Further, method 400 includes an act 460 of accessing a portion of the translated audio. Act 460 can comprise accessing a portion of the translated audio that corresponds with the particular time stamp. For example, the head-mounted display 110 or a remote system that is in communication with the head-mounted display 110 identifies within the database of translated audio 350 a portion of the translated audio that matches the previously identified timestamp.

Further still, method 400 includes an act 470 of displaying the portion of the translated audio. Act 470 comprises displaying on a user interface the portion of the translated audio. For example, as depicted in FIG. 2, the head-mounted display 110 can display a video of a sign-language translation 210 that is matched in time to an audio recording that is playing in relation to the museum piece 200.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated distributed computing systems, such as so-called "cloud" computing systems. In this description, "cloud computing" may be systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Cloud and remote based service applications are prevalent. Such applications are hosted on public and private remote systems such as clouds and usually offer a set of web based services for communicating back and forth with clients.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line-based user interface, function key or hot key user interfaces, and the like.

Disclosed embodiments may comprise or utilize a special purpose or general-purpose computer including computer hardware, as discussed in greater detail below. Disclosed embodiments also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry program code in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method for providing on-demand sign-language translation services, comprising:
   receiving from a microphone a first audio recording of ambient noise;
   accessing a database of audio fingerprints, wherein each fingerprint within the audio fingerprints comprises information for identifying time stamps within audio files associated with each audio fingerprint;
   identifying within the first audio recording a particular audio fingerprint from the database of audio fingerprints;
   identifying within the particular audio fingerprint a particular time stamp associated with the first audio recording;
   accessing a database of translated audio;
   accessing a portion of the translated audio that corresponds with the particular time stamp;
   receiving, from a video camera, an image of a target object, wherein the target object to associated with the ambient noise;
   identifying, within the image, a relative translation location; and
   displaying on a user interface the portion of the translated audio, such that the portion of the translated audio is displayed by a head-mounted display at the relative translation location.

2. The method of claim 1, further comprising:
   receiving, from the microphone, a second audio recording of the ambient noise;
   identifying within the particular audio fingerprint a second timestamp associated with the second audio recording; and
   resynchronizing the portion of the translated audio with the second timestamp.

3. The method of claim 1, wherein identifying, within the image, the relative translation location comprises:
   overlaying a grid coordinate system over the target object; and
   receiving, from the database of translated audio, a coordinate associated with the relative translation location.

4. The method of claim 1, wherein the portion of the translated audio comprises a video of a sign-language interpretation.

5. The method of claim 1, wherein the portion of the translated audio comprises closed-caption text.

6. The method of claim 1, wherein the portion of the translated audio comprises a video of a sign-language interpretation of the ambient noise.

7. The method of claim 1, wherein the target object is a movie.

8. The method of claim 7, wherein the ambient noise comprises a soundtrack to the movie.

9. The method of claim 1, wherein the target object is a physical object.

10. A computer system for providing on-demand sign-language translation services, comprising:
one or more processors; and
one or more computer-readable media having stored thereon executable instructions that when executed by the one or more processors configure the computer system to perform at least the following:
receive from a microphone a first audio recording of ambient noise;
access a database of audio fingerprints, wherein each fingerprint within the audio fingerprints comprises information for identifying time stamps within audio files associated with each audio fingerprint;
identify within the first audio recording a particular audio fingerprint from the database of audio fingerprints;
identify within the particular audio fingerprint a particular time stamp associated with the first audio recording;
access a database of translated audio;
access a portion of the translated audio that corresponds with the particular time stamp;
receive, from a video camera, an image of a target object, wherein the target object to associated with the ambient noise;
identify, within the image, a relative translation location; and
display on a user interface the portion of the translated audio, such that the portion of the translated audio is displayed by a head-mounted display at the relative translation location.

11. The computer system of claim 10, wherein the executable instructions include instructions that are executable to configure the computer system to:
receive, from the microphone, a second audio recording of the ambient noise;
identify within the particular audio fingerprint a second timestamp associated with the second audio recording; and
resynchronize the portion of the translated audio with the second timestamp.

12. The computer system of claim 10, wherein the executable instructions include instructions that are executable to configure the computer system to:
overlaying a grid coordinate system over the target object; and
receiving, from the database of translated audio, a coordinate associated with the relative translation location.

13. The computer system of claim 10, wherein the portion of the translated audio comprises a video of a sign-language interpretation.

14. The computer system of claim 10, wherein the portion of the translated audio comprises closed-caption text.

15. The computer system of claim 10, wherein the portion of the translated audio comprises a video of a sign-language interpretation of the ambient noise.

16. The computer system of claim 10, wherein the target object is a movie.

17. The computer system of claim 16, wherein the ambient noise comprises a soundtrack to the movie.

18. The computer system of claim 10, wherein the target object is a physical object.

* * * * *